US011415500B2

(12) United States Patent
Kato et al.

(10) Patent No.: US 11,415,500 B2
(45) Date of Patent: Aug. 16, 2022

(54) PARTICULATE OBSERVATION DEVICE AND PARTICULATE OBSERVATION METHOD (71) Applicant: National Institute of Advanced Industrial Science and Technology, Tokyo (JP)

(72) Inventors: Haruhisa Kato, Tsukuba (JP); Yusuke Matsuura, Tsukuba (JP); Ayako Nakamura, Tsukuba (JP)

(73) Assignee: National Institute of Advanced Industrial Science and Technology, Tokyo (JP)

(*) Notice: Subject to any disclaimer, the term of this patent is extended or adjusted under 35 U.S.C. 154(b) by 105 days.

(21) Appl. No.: 17/051,835

(22) PCT Filed: Aug. 30, 2019

(86) PCT No.: PCT/JP2019/034228
§ 371 (c)(1),
(2) Date: Oct. 30, 2020

(87) PCT Pub. No.: WO2020/054466
PCT Pub. Date: Mar. 19, 2020

(65) Prior Publication Data
US 2021/0055197 A1 Feb. 25, 2021

(30) Foreign Application Priority Data

Sep. 12, 2018 (JP) .............................. JP2018-170407
Apr. 26, 2019 (JP) .............................. JP2019-085230

(51) Int. Cl.
G01N 15/02 (2006.01)
G06T 7/55 (2017.01)

(52) U.S. Cl.
CPC ............ *G01N 15/0211* (2013.01); *G06T 7/55* (2017.01); *G01N 2015/0238* (2013.01)

(58) Field of Classification Search
CPC ... G01N 15/0211; G01N 15/0227; G06T 7/55
See application file for complete search history.

(56) References Cited

U.S. PATENT DOCUMENTS 7,929,135 B2 * 4/2011 Nakano .............. G01N 15/0211
356/335
2010/0110177 A1 5/2010 Yamada et al.
(Continued)

FOREIGN PATENT DOCUMENTS

CN 214666649 U * 11/2021
JP 2006-113462 A 4/2006
(Continued)

OTHER PUBLICATIONS

Edwin van der Pol et al., "Refractive Index Determination of Nanoparticles in Suspension Using Nanoparticle Tracking Analysis," American Chemical Society, Nano Letters 2014, 14, pp. 6195-6201. (discussed in the spec).

(Continued)

Primary Examiner — Rebecca C Bryant
(74) Attorney, Agent, or Firm — Locke Lord LLP (57) ABSTRACT The purpose of the present invention is to provide a particulate observation device using light scattering, which includes a means for determining the three-dimensional position of a particle, and can measure an accurate particle size or impart various properties of same. The present invention is characterized by including a position determination means which captures, with an optical microscope, an (Continued)

image of light scattered from particles in a dispersion medium to which laser light is emitted, and determines a three-dimensional position of each particle from the obtained two dimensional image, wherein the position determination obtains two-dimensional coordinates along the two-dimensional image from luminescent point positions of the particles, and determines the depth position along a coordinate axis vertical to the two-dimensional image from the diameters of diffraction fringes of the luminescent points.

12 Claims, 8 Drawing Sheets

(56) References Cited

U.S. PATENT DOCUMENTS

| | | |
|---|---|---|
| 2012/0135535 A1 | 5/2012 | Grier et al. |
| 2016/0349165 A1 | 12/2016 | Kawano et al. |
| 2017/0307509 A1 | 10/2017 | Boccara et al. |
| 2018/0120214 A1 | 5/2018 | Kato et al. |

FOREIGN PATENT DOCUMENTS

| | | |
|---|---|---|
| JP | 2008-261737 A | 10/2008 |
| JP | 2012-515351 A | 7/2012 |
| JP | 2017-534886 A | 11/2017 |
| JP | 2018-049019 A | 3/2018 |
| WO | 2016/159131 A1 | 10/2016 |

OTHER PUBLICATIONS

Yusuke Matsuura et al., "Determination of an accurate size distribution of nanoparticles using particle tracking analysis corrected for the adverse effect of random Brownian motion," Physical Chemistry Chemical Physics 2018, 20, pp. 17839-17846.

Sarah Frisken Gibson, "Experimental test of an analytical model of aberration in an oil-immersion objective lens used in three-dimensional light microscopy," Journal of the Optial Society of America. vol. 9, No. 1, 1992, p. 154-166. (cited in the ISR).

Yusuke Matsuura et al., "Determination of Nanoparticle Size Using a Flow Particle-Tracking Method," Analytical Chemistry 2018, 90 pp. 4182-4187.

International Search Report dated Nov. 19, 2019, issued for PCT/JP2019/034228.

* cited by examiner

PARTICULATE OBSERVATION DEVICE AND PARTICULATE OBSERVATION METHOD

TECHNICAL FIELD

The present invention relates to a device and a method for observing fine particles in a dispersion medium in an optical cell, and in particular relates to a particulate observation device that includes a means for determining a three-dimensional position of each particle from a two-dimensional image and that can also provide information such as particle size or material, and to a particulate observation method.

BACKGROUND ART

As indicated by Patent Document 1 or 2, as a method of measuring a particle size of fine particles in a dispersion medium, a method of obtaining the particle size by emitting laser light onto the dispersion medium in an optical cell and successively imaging the motion of the particles by a video camera to capture movement is known. For example, in Patent Document 1, by particle tracking analysis (PTA), a particle size is obtained by capturing Brownian motion of a particle from successively imaged images.

Typically, the movement of each particle is captured from a plurality of two-dimensional images, the self-diffusion coefficient D is obtained as the magnitude of Brownian motion, and each particle size d is determined from the Stokes-Einstein equation as described below. The self-diffusion coefficient D of a particle depends only on the particle size d, and thus it is possible to determine the particle size irrespective of the material of the particle. Here, when the particle size is sufficiently small, light scattered from the particle is imaged as a bright spot on a two-dimensional image.

$$D = \frac{k_B T}{3\pi \eta d} \quad (1)$$

$k_B$: Boltzmann constant η: Dispersion medium π: Pi T: Absolute temperature

In contrast, the intensity of light scattered from each particle depends not only on the particle size but other material properties, for example, the refractive index which reflects the material of the particle, and by measuring the intensity of scattered light, it is possible to use the particle size measured from the Brownian motion as described above to obtain this refractive index. For example, with a particle having a diameter that is sufficiently smaller than the wavelength of laser light, because light scattering undergoes Rayleigh scattering, a scattered light intensity I is represented by a proportional relationship as described below. If the corresponding proportional coefficient is obtained in advance using calibration particles, it is possible to obtain a relative refractive index m for the particle, with respect to the dispersion medium.

$$I \propto \left| \frac{m^2 - 1}{m^2 + 2} \right|^2 \frac{d^6}{\lambda^4} I_0 \quad (2)$$

λ: Wavelength of laser $I_0$: Intensity of incident laser light

Non-Patent Document 1 discloses an example in which, regarding particles of a submicron size, the refractive index is obtained by using a commercially available PTA device to image the scattered light of individual particles in a dispersion medium, and, in accordance with image analysis, calculate the scattered light intensity from an imaged bright spot image.

Patent Document 1: PCT International Publication No. WO2016/159131
Patent Document 2: Japanese Unexamined Patent Application, Publication No. 2008-261737
Non-Patent Document 1: E van der Pol, FAW Coumans, A Sturk, R Nieuwland, TG van Leeuwen; Nano Letters 14 6195-6201

DISCLOSURE OF THE INVENTION

Problems to be Solved by the Invention

An accurate determination of particle size by PTA requires movement for a three-dimensional particle position to be captured. In addition, as described above, in a method of obtaining various physical properties of a particle by measuring an intensity ratio ($I/I_0$) of scattered light with respect to incident light, if a light source that is not spatially uniform in an intensity distribution as with laser light is used, accurate measurement is not possible without correcting the light intensity of the incident light at the particle position. Accordingly, it is necessary to know the position of the particle inside the laser light, in other words the three-dimensional particle position.

For this point, Patent Document 2 discloses that the three-dimensional positions of particles can be determined by obtaining the positions of the particles in a two-dimensional image on the focal plane of a camera and obtaining the positions of the particles in the forward/backward direction (depth direction) with respect to the image using an analytical solution to the flow velocity in the direction perpendicular to the optical axis of the camera according to the Navier-Stokes equations.

The present invention is made in light of circumstances as described above, and has a purpose of providing a particulate observation device and a particulate observation method that enable accurate measurement of particle size and also provide information on the various physical properties of the particle.

Means for Solving the Problems

The present invention relates to a particulate observation device that uses light scattering, including: an optical microscope unit that images light scattered from particles in a dispersion medium to which laser light is emitted; and a processing unit that determines a three-dimensional position for each of the particles from a two-dimensional image obtained by the optical microscope unit, wherein the optical microscope unit provides the two-dimensional image by considering bright spots having diffraction fringes to be the particles, and the processing unit obtains, from bright spot positions of the particles, two-dimensional coordinates that follow the two-dimensional image, and determines, from a diameter of the diffraction fringes of the bright spots, a depth position along a coordinate axis perpendicular to the two-dimensional image.

By this invention, it is possible to accurately determine, in accordance with a position determination means, the three-dimensional position of a particle from a two-dimensional image, and be able to provide an accurate measurement of the particle size and information on various physical properties of the particle.

The present invention also relates to a particulate observation method that uses light scattering, including: a position determination step of determining, from a two-dimensional image obtained by the optical microscope that images light scattered from particles in a dispersion medium to which laser light is emitted, a three-dimensional position for each of the particles, wherein the position determination step obtains, from bright spot positions of the particles, two-dimensional coordinates that follow the two-dimensional image, and determines, from a diameter of the diffraction fringes of the bright spots, a depth position along a coordinate axis perpendicular to the two-dimensional image.

By this invention, it is possible to accurately determine, by the position determination step, the three-dimensional position of a particle from a two-dimensional image, and it is possible to obtain physical properties of the particle.

PREFERRED MODE FOR CARRYING OUT THE INVENTION

A description is given below regarding a particulate observation device which is one embodiment of the present invention, and a particulate observation method.

Figure 1:
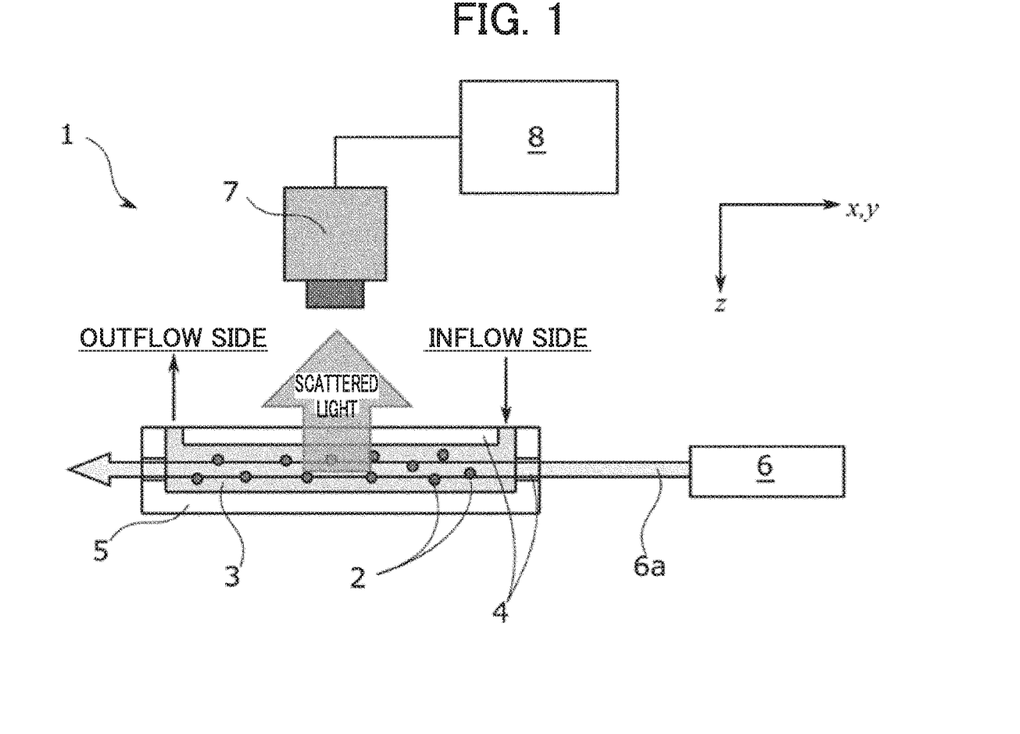
FIG. 1 is a block view of a particulate observation device according to the present invention.
Figure 2:
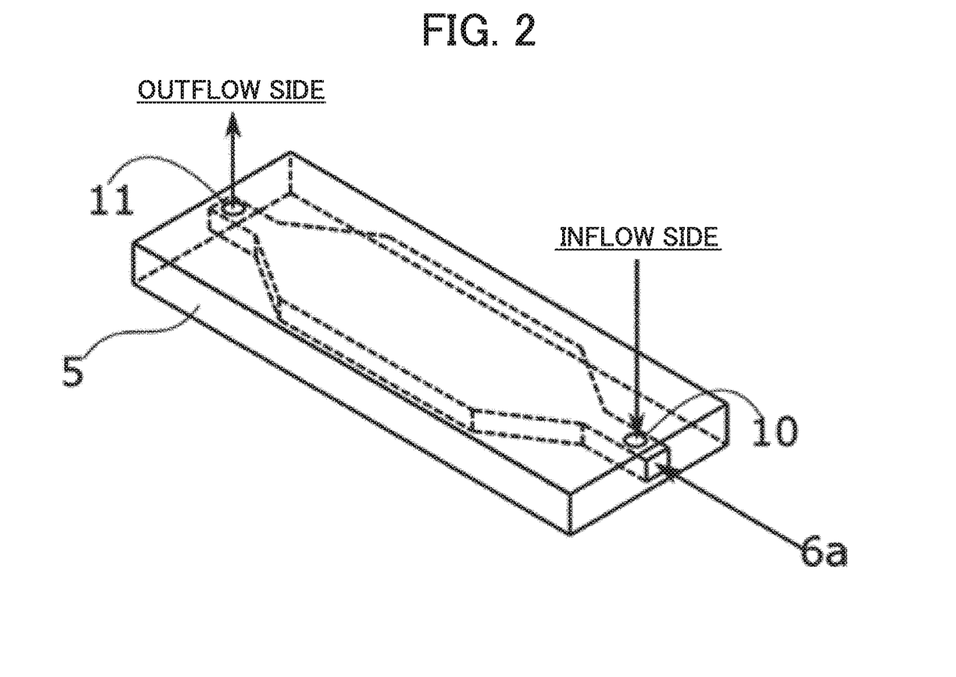
FIG. 2 is a perspective view illustrating an optical cell.
Figure 3:
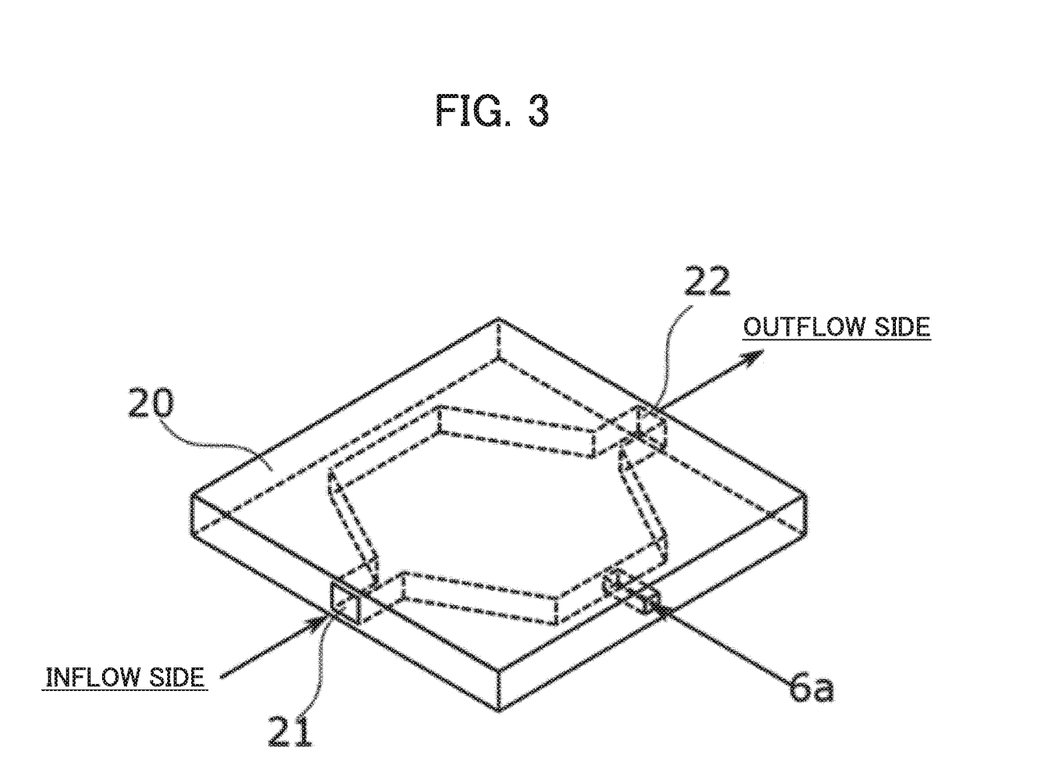
FIG. 3 is a perspective view illustrating another example of an optical cell.

Firstly, FIG. 1 to FIG. 3 are used to describe the particulate observation device.

FIG. 1 is a block view illustrating a particulate observation device 1 which is able to obtain the particle size and can also calculate the scattered light intensity ratio of the particle. The particulate observation device 1 is provided with an optical cell 5 having an optical window 4 into which it is possible to inject a dispersion medium 3 in which particles 2 are dispersed, which flows within the optical cell 5, a laser light emission unit 6 that can emit laser light 6a with a wavelength A toward the dispersion medium 3 inside the optical cell 5, an imaging device 7 that can image a scattered light image in accordance with scattered light arising from the particles 2, and an analysis device 8 that analyzes this scattered light image.

The laser light emission unit 6 is arranged so that it is easy for the imaging device 7 to image light scattered from the particles 2 in accordance with the laser light 6a. The imaging device 7 is provided with an optical microscope system having a magnification M that includes an objective lens with a numerical aperture NA; and a camera that can save scattered light images as a video, such as a CCD camera or a CMOS camera. Here, the optical axis of the laser light 6a is set to be parallel to the longitudinal direction of the optical cell 5 and perpendicular to the optical axis of the camera of the imaging device 7, and is also arranged facing a thickness direction of the optical cell 5. For the description given below, the optical axis direction of the imaging device 7 is set as the z axis, and directions perpendicular to the optical axis are set as the x axis and y axis. Because the optical axis direction of the laser light 6a does not necessarily need to be perpendicular to the optical axis direction of the imaging device 7 and it is sufficient if it is possible to image light scattered from the particles 2, there is no limitation to the device configuration example described above.

FIG. 2 is a perspective view illustrating the optical cell 5. The dispersion medium 3, which is injected from an inlet 10 provided on the top of the optical cell 5, flows while maintaining a flow velocity vector parallel to the optical axis of the laser light 6a due to a flow path having a rectangular cross-section of which an aspect ratio is sufficiently larger than 1, and is ejected from an outlet 11 provided on the top of the optical cell 5.

As illustrated by FIG. 3, the direction of the flow velocity vector does not necessarily need to be parallel to the optical axis direction of the laser light 6a, and, for example, configuration may be taken to use an optical cell 20 provided with an inlet 21 and an outlet 22 on sides thereof, and emit the laser light 6a to be perpendicular to the flow direction.

Figure 4:
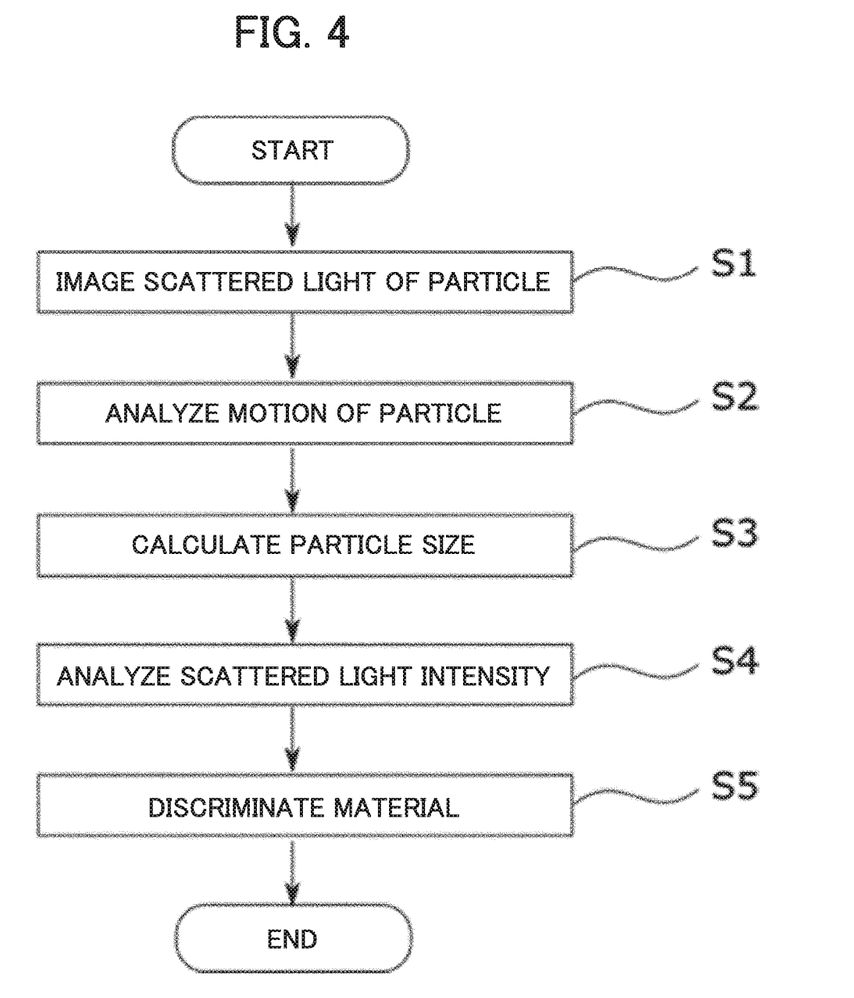
FIG. 4 is a flow chart illustrating a particulate observation method according to the present invention.
Figure 5:
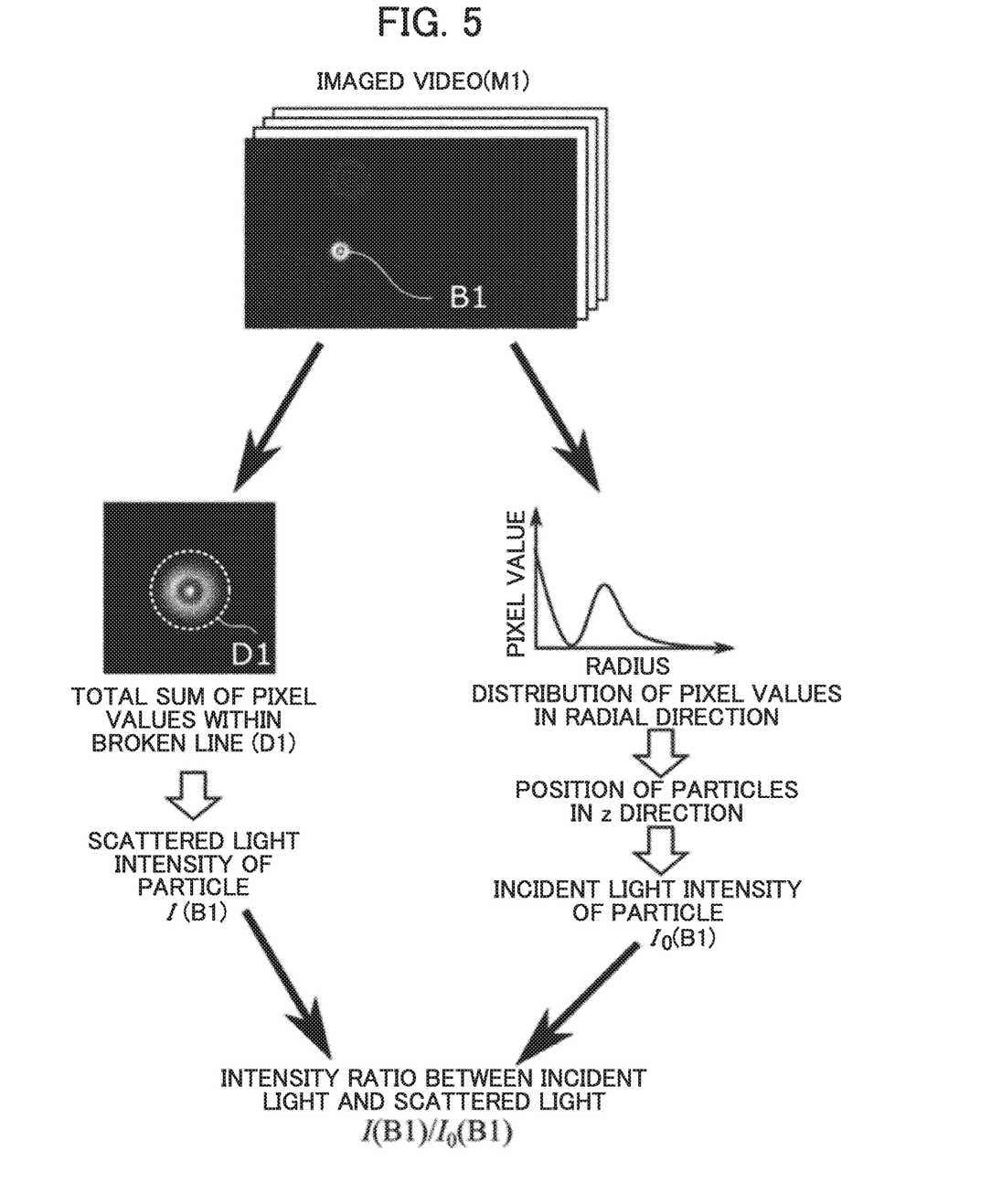
FIG. 5 is a view for describing an example of how to obtain an intensity ratio of incident light and scattered light.
Figure 6:
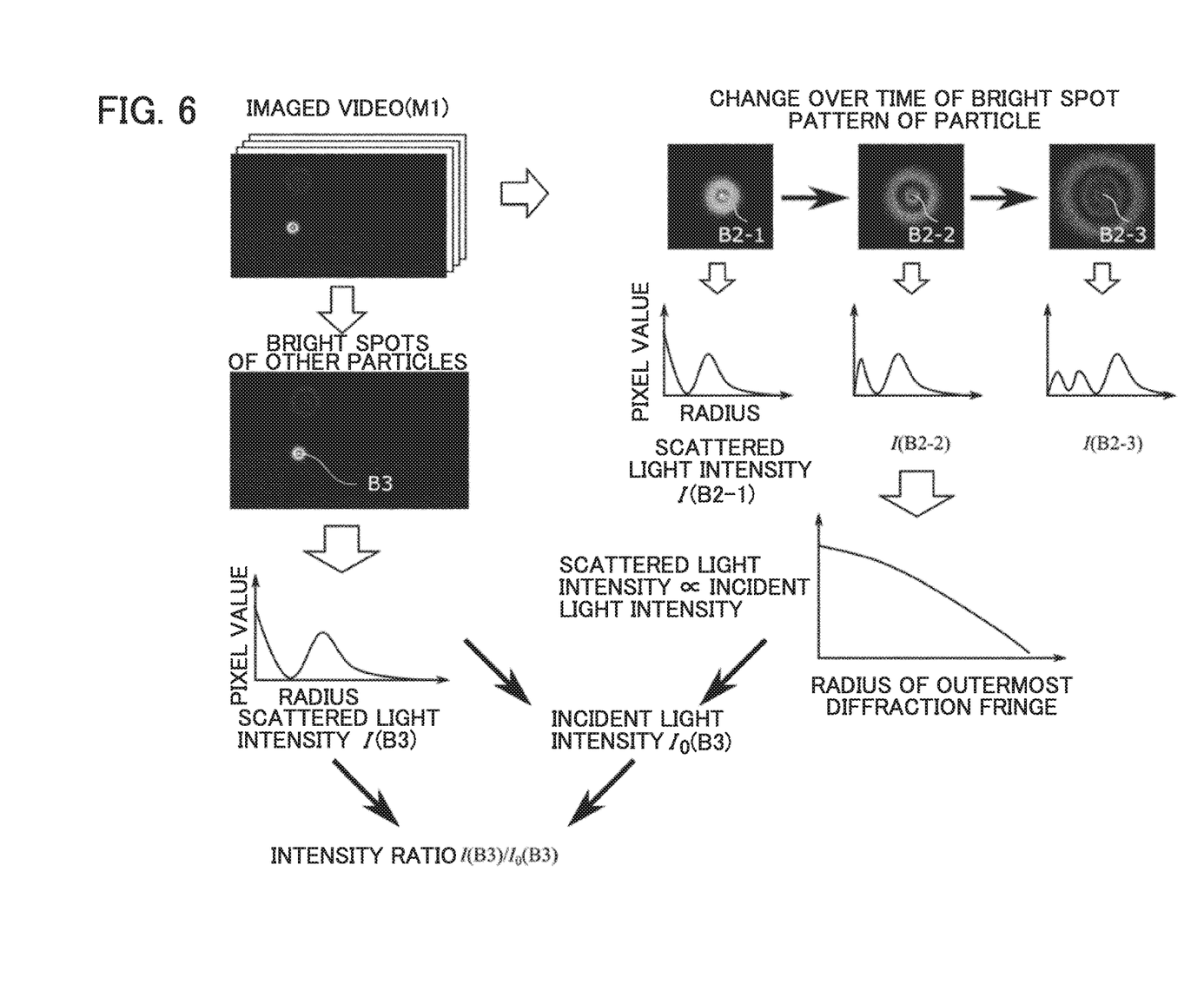
FIG. 6 is a view for describing another example of how to obtain an intensity ratio of incident light and scattered light.

Next, FIG. 4 to FIG. 6 are used to describe the particulate observation method which uses the particulate observation device 1.

As illustrated by FIG. 4, firstly, light scattered from the particles 2 which arises due to emission of the laser light 6a is imaged by the imaging device 7 and saved in the analysis device 8 as a video in accordance with two-dimensional images (step S1). Next, particles are tracked by comparing two-dimensional coordinates (x-y coordinates) of bright spots in adjacent frames and associating bright spots closest to one another as the same particle, and obtaining two-dimensional motion trajectories in the x-y plane for each particle (step S2). If there are no bright spots that are close, it is determined that the particles have deviated from a region onto which the laser is emitted, and tracking of the particles stops. Next, by PTA, the diffusion coefficient of each particle is calculated from the obtained trajectories of motion, and the diameter of each particle is calculated in accordance with the Stokes-Einstein equation (step S3). PTA is not described in detail because it is publicly known.

Next, referring also to FIG. 5, the scattered light intensity of each particle is obtained (step S4). In other words, a bright spot B1 that does not overlap with a bright spot in accordance with light scattered from another particle is extracted from an imaged video M1, a total of pixel values inside a region D1 that completely surrounds the bright spot B1 is set as the luminance of the bright spot B1, and a scattered light intensity I(B1) is obtained by correcting for effects due to the exposure time and the sensitivity of the imaging device 7. Simultaneously, the depth position of the pixel in the z axis direction is identified by analyzing the shape of diffraction fringes of the bright spot B1, for example the distribution of pixel values in a radial direction of diffraction fringes, and, together with the two-dimensional coordinates of the bright spot on a two-dimensional image, the three-dimensional position of the particle is determined. Furthermore, an incident light intensity $I_0$(B1) incident on the particle corresponding to the bright spot B1 is obtained by making a comparison with the three-dimensional intensity distribution of incident light in accordance with the laser light 6a, which is known or measured in advance. Finally, an intensity ratio I(B1)/$I_0$(B1) between the scattered light and the incident light is calculated. The procedure above is executed by the analysis device 8 which is a processing unit, and the analysis device 8 can output a result of this procedure as appropriate.

As described above, in a case where the optical axis of the camera of the imaging device 7 is arranged perpendicular to the optical axis of the laser light 6a and the intensity of the laser light 6a at a plane parallel to a two-dimensional image of the video M1 can be considered to be constant, it is possible to obtain the incident light intensity using only the depth position of the three-dimensional position. In other words, it may be regarded that the distribution of the incident light intensity is only a distribution in the depth direction (z axis direction), and the incident light intensity can be simply obtained.

By investigating the relationship between the particle size and the corresponding intensity ratio, material that makes up the particle is estimated (step S5). For example, in the case of a particle smaller than the wavelength A of the laser light 6a, by comparing a value resulting from dividing the intensity ratio by the sixth power of the particle size with that for a particle in accordance with a known material, it is possible to obtain the refractive index of the particle which is of an unknown material from the relational expression set forth in Math. 2 between incident light intensity, scattered light intensity, the refractive index of the material that makes up the particle, and the particle size. It is possible to estimate the material that makes up the particle based on the refractive index obtained in this way.

In the measurement of the scattered light intensity in step S4, an intensity distribution of incident light in accordance with the laser light 6a may be obtained from the pattern (shape) of the diffraction fringes in the imaged video (M1). This method is described in detail using FIG. 6.

Giving attention to the bright spot in accordance with the light scattered from a single particle that is imaged in the video (M1), a situation where the shape of the diffraction fringes and the scattered light intensity change over time due to the particle moving in the z axis direction is analyzed.

For example, FIG. 6 represents a situation where a pattern of the diffraction fringes of a bright spot in accordance with a single particle changes from B2-1 to B2-2 to B2-3. In relation to each bright spot, scattered light intensity I(B2-1), I(B2-2), and I(B2-3), and the distribution of pixel values in the radial direction of the diffraction fringes in accordance with the method described above are calculated, and the relationship between the radius of the outermost diffraction fringe and the scattered light intensity is investigated. In relation to a single particle, because the incident light intensity and the scattered light intensity are proportional, this means that the relationship between the radius of the outermost diffraction fringe and the incident light intensity can be obtained. In other words, in relation to a bright spot (B3) for another particle, it is possible to convert the radius of the outermost diffraction fringe to the incident light intensity $I_0$(B3) and measure the scattered light intensity I(B3) to obtain the intensity ratio I(B3)/$I_0$(B3) between the scattered light and the incident light.

Next, in measurement of the refractive index using the particulate observation method described above, FIG. 4 is used to give a description regarding improving the accuracy of the measurement by correcting the distribution of the intensity ratio which arises due to the particle size distribution.

Referring to FIG. 4, firstly, imaging of light scattered from a particle (step S1) and analysis of particle motion (step S2) are performed. Next, in the calculation of the particle size (step S3), each value of the particle size calculated is influenced randomly by Brownian motion, and thus is not a fixed value but includes variation. Accordingly, a measured particle size distribution is wider than the true distribution. Therefore, a method of correction disclosed by a reference (Y Matsuura et al., Physical Chemistry Chemical Physics 20 17839), for example, is used, and a particle size distribution that corrects this widening is obtained.

Next, by performing the analysis of the scattered light intensity (step S4) by the same procedure as that described above, the scattered light/incident light intensity ratio for each particle is obtained.

In the discrimination of the material (step S5), a relative refractive index for a group of particles is determined in accordance with the procedure described next to thereby estimate the materials that make up the particles. Firstly, from the relationship between scattered light/incident light intensity ratio, particle size, and relative refractive index, the relationship between the scattered light/incident light intensity ratio and the relative refractive index when the value of the particle size is fixed to an average value is obtained. This relationship can be obtained by the relational expression set forth in Math. 2 in the case of particles that are sufficiently smaller than the wavelength λ of the laser light 6a, for example, and can be obtained by the Mie scattering theory in the case of particle sizes that are comparable to the wavelength A. Next, using the relationship between the scattered light/incident light intensity ratio and the relative refractive index obtained above, the scattered light/incident light intensity ratio obtained by the analysis of the scattered light intensity (step S4) in relation to each particle is converted to the relative refractive index. Due to the effect of the distribution of the scattered light intensity which arises due to the particle size distribution, the converted relative refractive index for each particle will have a distribution. By correcting the refractive index distribution generated which occurs due to the particle size distribution, the relative refractive index of the group of particles is determined. This correction process is described in detail below.

Letting the standard deviation of the particle size distribution be σ(d), the standard deviation $\sigma_d$ (I/$I_0$) of the distribution of the scattered light/incident light intensity ratio which occurs due to the particle size distribution is represented below.

$$\sigma_d(I/I_0) = \left[\frac{\partial(I/I_0)}{\partial d}\right]\sigma(d) \qquad (3)$$

The standard deviation $\sigma_d(m)$ of the relative refractive index distribution generated which occurs due to the influence of the distribution of this intensity ratio is represented by the following equation.

$$\sigma_d(m) = \left[\frac{\partial m}{\partial (I/I_0)}\right]\sigma_d(I/I_0) = \left[\frac{\partial (I/I_0)}{\partial d} \Big/ \frac{\partial (I/I_0)}{\partial m}\right]\sigma(d) \quad (4)$$

Accordingly, $\partial(I/I_0)/\partial d$ and $\partial(I/I_0)/\partial m$ with respect to the obtained average particle size and average relative refractive index of the group of particles are calculated. This calculation can be performed in accordance with the relational expression set forth in Math. 2 in the case of particles that are sufficiently smaller than the wavelength $\lambda$ of the laser light $6a$, for example, and can be performed in accordance with the Mie scattering theory in the case of particle sizes that are comparable to the wavelength. $\sigma_d(m)$ is then calculated by using the standard deviation of the particle size distribution which is determined in accordance with the calculation of particle size (step S3).

Next, letting the standard deviation of the distribution of the relative refractive index of the group of particles which is obtained in accordance with the scattered light/incident light intensity ratio of each particle be $\sigma_{observed}(m)$ a standard deviation $\sigma_{corrected}(m)$ of the corrected refractive index distribution is defined by the following equation. By this correction, it is possible to eliminate the effect that a particle size distribution which is widened by Brownian motion has on the refractive index of a group of particles. An example in which the correction was actually performed is described below.

$$\sigma_{corrected}(m) = \sqrt{(\sigma_{observed}(m))^2 - (\sigma_d(m))^2} \quad (5)$$

Examples

A description is given regarding an example in which the particulate observation device 1 is used to investigate the relationship between the pattern of a diffraction fringe of a bright spot and the incident light intensity. Polystyrene latex particles of diameter 100 nm were used as the particles 2, and water was used as the dispersion medium 3.

The flow path of the optical cell 5 had a width of 10 mm and a thickness of 0.8 mm. A solid state laser capable of emitting laser light $6a$ with a wavelength of 532 nm was used as the laser light emission unit 6, and a convex lens was used to concentrate light to give a Gaussian beam having a beam waist spot size of 190 μm at a position where observation was performed by the imaging device 7.

The imaging device 7 was provided with an optical microscope arranged to have its optical axis perpendicular to the optical axis of the laser light $6a$, and an sCMOS camera that images light scattered from the particles 2. In the optical microscope, a 10× objective lens with no glass correction and having a numerical aperture NA=0.25 was used, an image sensor in the sCMOS camera had one pixel corresponding to 6.5 μm square, and by being expanded by the objective lens, it was possible to image scattered light at a spatial resolution of 0.648 μm/pixel. The height of the microscope was adjusted so that the center of the flow path was the focal plane of the microscope. As a result, light scattered from the particles 2 is concentrated onto the sCMOS image sensor after passing through the dispersion medium which has a thickness of 0.4 mm, the optical window 4 which is made of quartz glass having a thickness of 1.6 mm as the top surface of the optical cell 5, and the objective lens. Images of scattered light obtained in this way were imaged at a frame rate of 30 fps and an exposure time of 33.2 ms, and the video M1 in accordance with a series of two-dimensional images was obtained.

Figure 7:
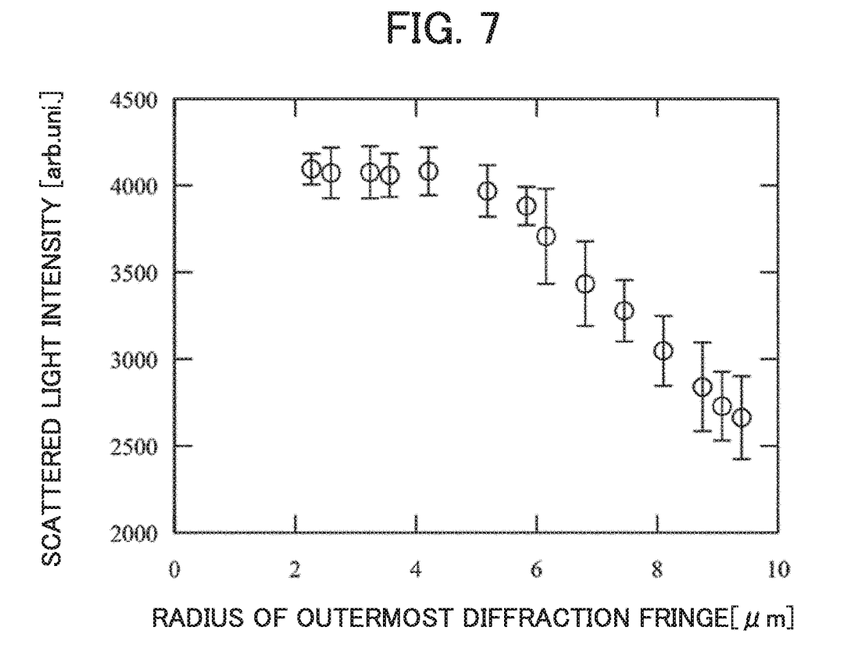
FIG. 7 is a graph illustrating a relationship between scattered light intensity and the radius of an outermost diffraction fringe.

FIG. 7 illustrates a result of investigating the relationship between the radius of the outermost diffraction fringe and the scattered light intensity for a bright spot in accordance with the light scatted from a single particle in the video M1. In FIG. 7, the horizontal axis represents the radius of the outermost diffraction fringe corrected to be 0.648 μm/pixel, and the vertical axis represents the measured scattered light intensity. In addition, error bars represent the repeat standard deviation. It was possible to obtain the result that the scattered light intensity decreases in accordance with the particle moving away from the focal plane of the microscope and causing the radius of the outermost diffraction fringe to increase.

In order to ascertain whether this decrease in scattered light intensity was due to a decrease in incident light intensity, a theoretical calculation regarding the relationship between the position of the particle in the z axis direction and the radius of the outermost diffraction fringe was performed. Considering that water having a refractive index of 1.33 and a thickness of 0.4 mm and glass having a refractive index of 1.46 and a thickness of 1.6 mm are present between the focal plane and the objective lens, FIG. 8 illustrates the result of calculating the relationship between the position of a particle in the z axis direction and the radius of the outermost diffraction fringe that was calculated using a theoretical formula for diffraction fringe patterns disclosed by a reference (SF Gibson et al., Journal of Optical Society of America A 9 154-166).

Figure 8:
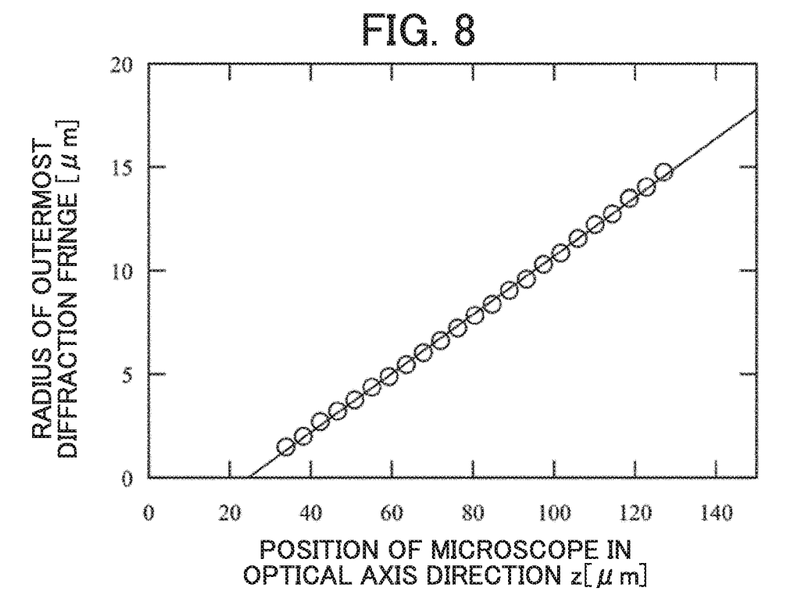
FIG. 8 is a graph illustrating a relationship between the position of a particle in the depth direction and the radius of an outermost diffraction fringe.

In FIG. 8, the horizontal axis represents the position of the particle in the z axis direction when a geometrical optical focal plane relating to an axis near the microscope is set to z=0, and a direction that goes away from the objective lens is set as positive. In contrast, the vertical axis represents a value resulting from dividing the radius R of the outermost diffraction fringe of a bright spot image appearing on the sCMOS image sensor by the objective lens magnification (M=10), in other words, the vertical axis represents the radius of the outermost diffraction fringe for an image enlarged by the objective lens. According to FIG. 8, it is understood that the radius of the outermost diffraction fringe linearly increases with z>30 μm. A fitted equation for this case is as written below, and is illustrated by a solid line in FIG. 8.

$$\frac{R}{M} = c_1 z - c_2 \quad (6)$$

$c_1 = 0.1417[-], c_1 = 3.4718 \; [\mu m]$

The focus on the particle was best near z=20 μm, and a clear diffraction fringe could not be obtained with z<0. The position where there is focus deviates from z=0 because an aberration occurs due to water and glass being in the light path.

Figure 9:
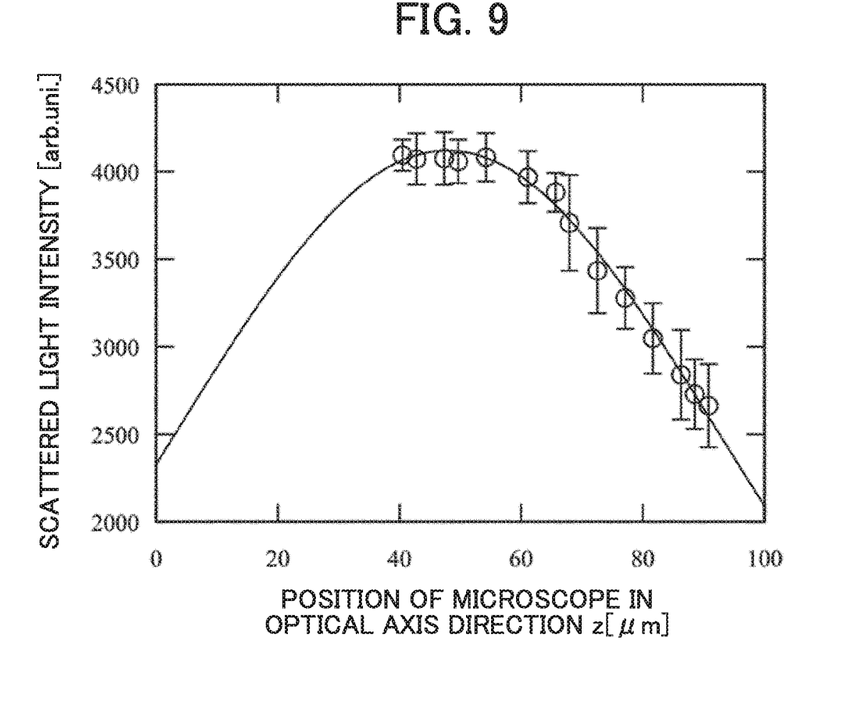
FIG. 9 is a graph illustrating a relationship between the position of a particle in the depth direction and the scattered light intensity.

As illustrated by FIG. 9, it is possible to use the above equation to correct the relationship between the radius of the outermost diffraction fringe and the scattered light intensity obtained in FIG. 7 to a relationship between z and the scattered light intensity. Considering that the laser light $6a$ is a Gaussian beam, a result of fitting a Gaussian function is also a solid line in FIG. 9. As a result of this fitting, a width Δz at which the scattered light intensity becomes $1/e^2$ is 180 μm, which roughly matches the spot size of the beam waist of the incident light which is 190 μm. As a result, the present example indicates that it was possible to obtain the incident light intensity distribution from the diffraction fringe and the scattered light intensity of a single particle. In addition, FIG. 7 indicates that, with the particulate observation device 1 which was used, it is possible to treat the incident light intensity regarding particles for which the radius of the outermost diffraction fringe is less than or equal to 5 μm as constant.

Next, a description is given of an example in which measurement was performed of the scattered light intensity of many particles positioned in the range at which the incident light intensity can be regarded as constant, as described above. The measurement device 1, the particles 2, and the dispersion medium 3 used here are the same as those described above.

The dispersion medium 3 was injected from the inlet 10 of the optical cell 5 at a flow rate of 0.01 mL/min, and the light scattered from the particles 2 which flow together with the dispersion medium 3 was imaged by the imaging device 7. Approximately 300 bright spots for which the radius of the outermost diffraction fringe was less than or equal to 5 μm were extracted, the scattered light intensity was calculated for these points, and a cumulative distribution of the scattered light intensity was obtained.

As a comparative experiment, a commercially available PTA device in which the spot size of the beam waist was concentrated to approximately 20 μm was used to image light scattered from particles, and approximately 300 bright spots were extracted, the scattered light intensity of these points was calculated, and a cumulative distribution of the scattered light intensity was obtained. However, because the volume into which laser light was emitted was small with this commercially available PTA device and diffraction fringes did not appear, the scattered light intensity of all imaged bright spots was used to calculate the cumulative distribution.

Figure 10:
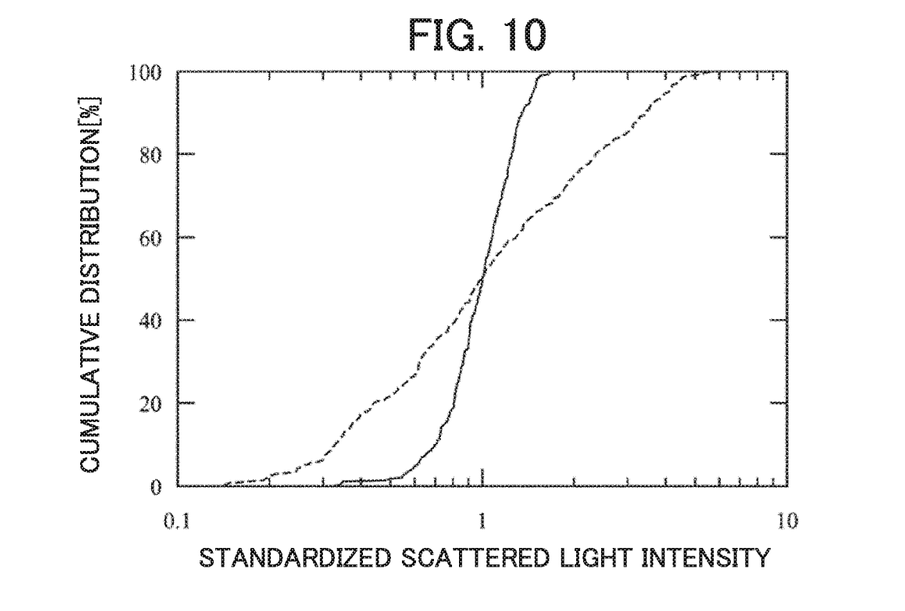
FIG. 10 is a graph illustrating cumulative distributions of scattered light intensity in accordance with the particulate observation device and a commercially available PTA device.

FIG. 10 illustrates the results for the two experiments described above. The solid line is the cumulative distribution of the scattered light intensity obtained by the particulate observation device 1, and the broken line represents the result in accordance with the commercially available PTA device. However, the scattered light intensity is standardized at the median for each distribution. As a result, while the relative standard deviation of the distribution for the commercially available PTA device was very broad at 84%, the relative standard deviation for the distribution of the particulate observation device 1 was 26%. In other words, it is indicated that considering the incident light intensity distribution by the particulate observation device 1 improves the accuracy of measuring the scattered light intensity of a particle.

Figure 11:
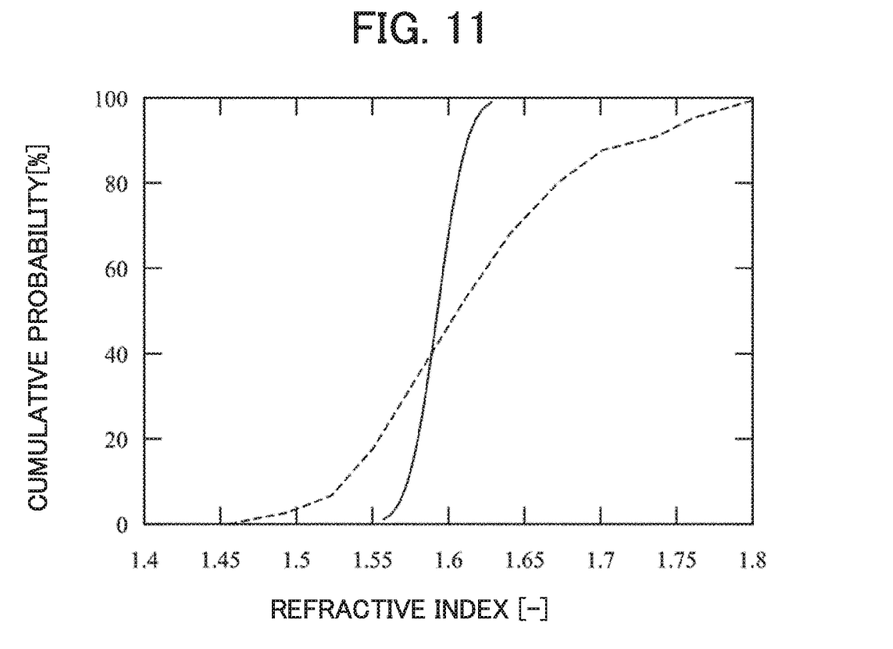
FIG. 11 is a graph illustrating a result of measuring the refractive index of a group of polystyrene particles.
Figure 12:
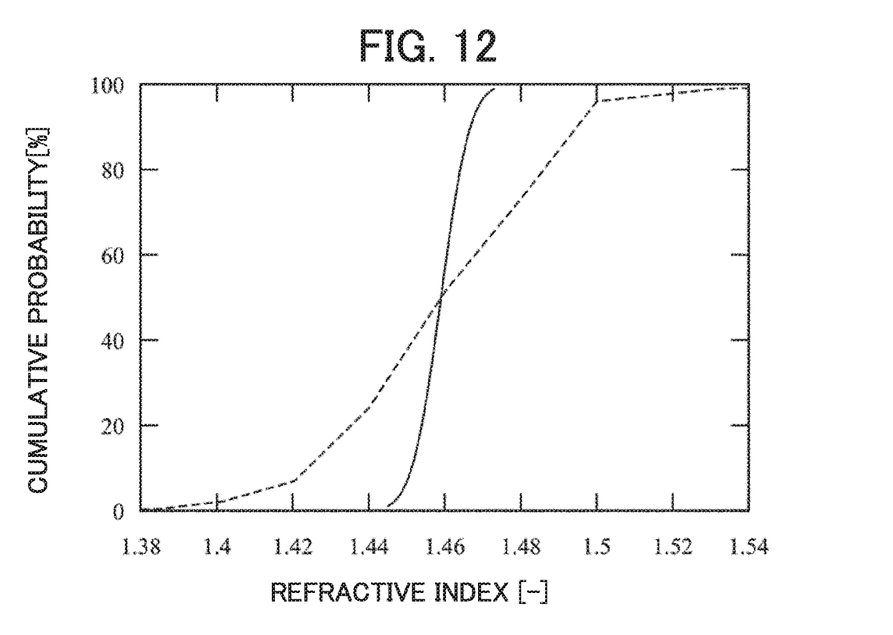
FIG. 12 is a graph illustrating a result of measuring the refractive index of a group of silica particles.

Next, using FIG. 11 and FIG. 12, a description is given regarding an example of measuring the refractive index of a group of particles, and correcting for the influence of the particle size distribution, based on the scattered light intensity of particles. The particulate observation device 1 and the dispersion medium 3 used here are the same as that described above, and, for the particles 2, silica particles with a diameter of 80 nm and polystyrene latex particles with a diameter of 60 nm were used in addition to the polystyrene latex particles with a diameter of 100 nm described above.

The dispersion medium 3 was injected at a flow rate of 0.01 mL/min from the inlet 10 (refer to FIG. 2) of the optical cell 5, and light scattered from the particles 2 which flow together with the dispersion medium 3 was imaged by the imaging device 7.

Analysis of the scattered light intensity of each particle was performed under each of the following two conditions.
(1) All imaged bright spots were used to give scattered light intensity data for each particle.
(2) Only bright spots for which the radius of the outermost diffraction fringe was less than or equal to 5 μm, which is the condition for the incident light intensity to be constant, were extracted to give scattered light intensity data for individual particles.

Because the scattered light that was imaged arises from the particles in the flow field, each of the particle size is evaluated in accordance with a flow field particle tracking method (flow particle tracking, FPT) disclosed by a reference (Y Matsuura et al., Analytical Chemistry 90 4182), and the widening due to Brownian motion is corrected to determine the particle size distribution.

The refractive index is calculated from the scattered light intensity, using the proportional relationship set forth in Math. 2. Firstly, for each of the above two conditions for scattered light intensity analysis, a proportional constant was determined so that the median of the scattered light intensity measured for polystyrene latex particles with a diameter of 100 nm matched the right side of the proportional relationship set forth in Math. 2. For the determination of this proportional constant, an average particle size determined in accordance with FPT was used for the value of particle size. Next, in relation to the polystyrene latex particles with a diameter of 60 nm and the silica particles with a diameter of 80 nm, the relative refractive index was obtained from the scattered light intensity for each particle, based on Math. 2.

By correcting for the influence of widening of the particle size distribution due to Brownian motion as described above, the refractive index of the group of particles was determined. In this correction, the terms set forth in Math. 4 that result from partial differentiation of $(I/I_0)$ by d and m, respectively, were determined by the relational expression set forth in Math. 2.

FIG. 11 illustrates the results of measuring the refractive index of a group of particles of polystyrene particles with a diameter of 60 nm. However, considering the refractive index of the dispersion medium, the horizontal axis is converted to the absolute refractive index. The solid line in FIG. 11 shows the distribution of refractive indexes obtained by correcting for the influence of particle size distribution described above after obtaining scattered light intensity data for each particle by extracting bright spots for which the radius of the outermost diffraction fringe is less than or equal to 5 μm, which is the condition for the incident light intensity to be constant. In contrast, the broken line shows the refractive index distribution obtained without correcting for the influence of particle size distribution after obtaining scattered light intensity data for each particle, using all bright spots that were imaged. The refractive index for the polystyrene group of particles can be considered to be a single value, but the refractive index distribution which is illustrated by the broken line and is obtained without performing correction extends over a wide range. In contrast, the refractive index distribution which is obtained after performing the correction and which is illustrated by the solid line is 1.593±0.015, and is over such a narrow range that the distribution can be said to be more or less a single value. This value was a good match for 1.598, the refractive index of polystyrene latex at the wavelength of the laser light 6a.

FIG. 12 illustrates the results of measuring the refractive index of a group of particles of silica particles with a diameter of 80 nm. Similarly to the case of FIG. 11, the solid line and the broken line respectively indicate the refractive index distribution obtained after correction, and the refractive index distribution obtained without correction. The refractive index distribution that is illustrated by the broken line and is obtained without correction extends over a wide range. In contrast, the refractive index distribution which is obtained after performing the correction and which is illustrated by the solid line is 1.459±0.006, and is over such a narrow range that the distribution can be said to be more or less a single refractive index value. This value was a good match for 1.461, the refractive index of silica at the wavelength of the laser light 6a.

In other words, it was shown that it is possible to, in accordance with the particulate observation device 1, evaluate a refractive index of a group of particles with high accuracy by correcting for the influence of particle size distribution and considering the incident light intensity distribution.

EXPLANATION OF REFERENCE NUMERALS

1 Particulate observation device
2 Particles
3 Dispersion medium
4 Optical window
5 Optical cell
6 Laser emission unit
6a Laser light
7 Imaging device
8 Analysis device
10 Inlet
11 Outlet

The invention claimed is:

1. A particulate observation device that uses light scattering, comprising:
an optical microscope unit that images light scattered from particles in a dispersion medium to which laser light is emitted; and a processing unit that determines a three-dimensional position for each of the particles from a two-dimensional image obtained by the optical microscope unit,
wherein the optical microscope unit provides the two-dimensional image by considering bright spots having diffraction fringes to be the particles, and
the processing unit obtains, from bright spot positions of the particles, two-dimensional coordinates that follow the two-dimensional image, and determines, from a diameter of the diffraction fringes of the bright spots, a depth position along a coordinate axis perpendicular to the two-dimensional image.

2. The particulate observation device according to claim 1, wherein the processing unit determines a magnitude of Brownian motion of the particles from the three-dimensional position, and provides a particle size from the magnitude.

3. The particulate observation device according to claim 2, wherein the processing unit determines an incident light intensity that is at the three-dimensional position and is associated with an intensity distribution of incident light obtained in advance, and obtains a relative refractive index for the particles from a relationship between an intensity ratio of the scattered light with respect to the incident light and the particle size.

4. The particulate observation device according to claim 3, wherein the relative refractive index is obtained after correcting a distribution of the intensity ratio arising due to a particle size distribution of the particles.

5. The particulate observation device according to claim 1, wherein the optical microscope unit provides a plane along an optical axis of the laser light as the two-dimensional image.

6. The particulate observation device according to claim 1, wherein the depth position is determined based on a proportional relationship between an amount of deviation from a focus position of the optical microscope and the diameter of the diffraction fringe.

7. A particulate observation method that uses light scattering, comprising:
a position determination step of determining, from a two-dimensional image obtained by the optical microscope that images light scattered from particles in a dispersion medium to which laser light is emitted, a three-dimensional position for each of the particles,
wherein the position determination step obtains, from bright spot positions of the particles, two-dimensional coordinates that follow the two-dimensional image, and determines, from a diameter of the diffraction fringes of the bright spots, a depth position along a coordinate axis perpendicular to the two-dimensional image.

8. The particulate observation method according to claim 7, further comprising a particle size calculation step that determines a magnitude of Brownian motion of the particles from the three-dimensional position, and calculates a particle size from the magnitude.

9. The particulate observation method according to claim 8, wherein an incident light intensity that is at the three-dimensional position and is associated with an intensity distribution of incident light obtained in advance is determined, and, for the particles, a relative refractive index of the particles is obtained from a relationship between an intensity ratio of the scattered light with respect to the incident light and the particle size.

10. The particulate observation method according to claim 9, wherein the relative refractive index is obtained after correcting a distribution of the intensity ratio arising due to a particle size distribution of the particles.

11. The particulate observation method according to claim 7, wherein the two-dimensional image corresponds to a plane along an optical axis of the laser light.

12. The particulate observation method according to claim 7, wherein the depth position is determined based on a proportional relationship between an amount of deviation from a focus position of the optical microscope and the diameter of the diffraction fringe.

* * * * *